US012145192B2

(12) United States Patent
His et al.

(10) Patent No.: US 12,145,192 B2
(45) Date of Patent: Nov. 19, 2024

(54) TOOL AND METHOD FOR CRIMPING A PART ON A SUPPORT

(71) Applicant: BOLLHOFF OTALU, La Ravoire (FR)

(72) Inventors: Valentin His, La Chapelle Longueville (FR); Bertrand Cuaz, Chambery (FR)

(73) Assignee: BOLLHOFF OTALU, La Ravoire (FR)

( * ) Notice: Subject to any disclaimer, the term of this patent is extended or adjusted under 35 U.S.C. 154(b) by 300 days.

(21) Appl. No.: 17/794,649

(22) PCT Filed: Feb. 12, 2021

(86) PCT No.: PCT/EP2021/053562
§ 371 (c)(1),
(2) Date: Jul. 22, 2022

(87) PCT Pub. No.: WO2021/160868
PCT Pub. Date: Aug. 19, 2021

(65) Prior Publication Data

US 2023/0074463 A1 Mar. 9, 2023

(30) Foreign Application Priority Data

Feb. 13, 2020 (FR) ....................................... 2001450

(51) Int. Cl.
*B21J 15/10* (2006.01)
*B21J 15/22* (2006.01)
(Continued)

(52) U.S. Cl.
CPC ............. *B21J 15/105* (2013.01); *B21J 15/22* (2013.01); *B25B 27/0014* (2013.01); *F15B 15/1447* (2013.01)

(58) Field of Classification Search
CPC ................................ B25J 15/105; B25J 15/22
See application file for complete search history.

(56) References Cited

U.S. PATENT DOCUMENTS 4,118,969 A 10/1978 Corbett
5,098,001 A * 3/1992 Smart .................... B21J 15/105 227/51

(Continued)

FOREIGN PATENT DOCUMENTS

| | | | |
|---|---|---|---|
| EP | 0787563 | A1 | 8/1997 |
| GB | 1569570 | A | 6/1980 |
| WO | 2008/132576 | A2 | 11/2008 |

OTHER PUBLICATIONS

Mar. 16, 2021 International Search Report issued in International Patent Application No. PCT/EP2021/053562.

*Primary Examiner* — Thomas E Lazo
(74) *Attorney, Agent, or Firm* — Oliff PLC

(57) ABSTRACT

Tool for crimping an element onto a support member, including a movably mounted rod, a first chamber containing a first fluid, a second chamber containing a second fluid, a piston movably mounted inside the second chamber and separating the second chamber into first and second compartments, an input terminal suitable for being connected to a second fluid source, and a main valve configured to direct the second fluid into the second compartment in order to move the piston to reduce the pressure of the first fluid and drive the rod in a direction opposite to a crimping direction.

4 Claims, 6 Drawing Sheets

(51) Int. Cl.
*B25B 27/00* (2006.01)
*F15B 15/14* (2006.01)

(56) References Cited

U.S. PATENT DOCUMENTS

| | | | | |
|---|---|---|---|---|
| 5,383,262 | A * | 1/1995 | Brown | B21J 15/20 29/243.525 |
| 5,544,407 | A * | 8/1996 | Ohuchi | B21J 15/323 29/DIG. 44 |
| 5,661,887 | A * | 9/1997 | Byrne | B21J 15/285 72/21.1 |
| 5,694,671 | A * | 12/1997 | Frearson | B21J 15/22 72/453.17 |
| 7,159,291 | B2 * | 1/2007 | Ohuchi | B21J 15/323 72/391.6 |
| 9,908,233 | B2 * | 3/2018 | Wilcox | B21J 15/105 |

* cited by examiner

TOOL AND METHOD FOR CRIMPING A PART ON A SUPPORT

BACKGROUND OF THE INVENTION

The invention relates to crimping of a part on a support, and more particularly to crimping of a clinch nut.

STATE OF THE ART

A part to be crimped is an assembly component designed to fix a part on a support. For example, a crimp part can be a nut, a rivet or a stud, and the support can be a wall panel. A nut is a tapped hollow part, i.e. comprising an internal thread, designed to be secured to another threaded part. A rivet is a deformable part not comprising a thread. A stud is a threaded solid part, i.e. comprising an external thread. In particular, a part to be crimped comprises a head and a deformable body to form a crimp bead so as to crimp the part on the support, the crimp bead enabling the support to be wedged between the head of the part and the crimp bead. In general, the parts to be crimped are crimped on the supports before final assembly.

At the present time, assembly components are crimped by means of a crimping tool that can be operated manually or fitted on a robot. In particular, certain assembly lines of parts cannot be equipped with a robot and a manually operated crimping tool then has to be used. Certain assembly lines are modular to provide a greater flexibility for complex assemblies, or in case of preparation, and are less automated. This is the case for example when the operator has to follow the progress of the assembly to perform his crimping operation or when operations are performed on a work site.

International application WO2008/132576, filed on Apr. 23rd 2008, can be cited disclosing a pneumatic and hydraulic riveting machine comprising a pneumatic motor driving a threaded tie-rod so as to engage the threaded tie-rod with a tapped axial hole of a rivet, and a hydraulic system that communicates an axial translation to the drive unit to translate the threaded tie-rod and crimp the rivet on a wall. The hydraulic system comprises a primary piston housed in a first cylinder containing a liquid and that compresses the liquid of the hydraulic system. The riveting machine further comprises a pneumatic system fed by a compressed air source, and a trigger valve that directs compressed air via a feed pipe to a second pneumatic cylinder to make the primary piston move upwards, with compression of a first return spring connected to the primary piston resulting in compression of the liquid and triggering of axial translation of the drive unit/tie-rod. Then when the maximum pressure of the liquid is reached, the air contained in the pneumatic cylinder resumes its path in the opposite direction in the feed pipe. Outlet of air from the pneumatic cylinder is promoted by relaxation of the first return spring which returns the primary piston to the initial position.

This riveting machine is however not sufficiently precise, in particular as regards the value of the axial force generated on the tie-rod and therefore on the rivet. Movement of the primary piston does in fact have to be performed with a strong force so as to move the primary piston and at the same time translate the threaded tie-rod and compress the first return spring. This strong force has to be higher than the resistance force generated by the first return spring resulting in frictions on the primary piston and a lack of precision of the riveting machine.

SUMMARY OF THE INVENTION

One object of the invention consists in remedying these shortcomings, and more particularly in providing a means for crimping a part on a support that is precise and quick.

According to one feature of the invention, a tool for crimping a part on a support is proposed comprising:

- a rod mounted movably and configured to collaborate in removable manner with the part,
- a first chamber containing a first fluid,
- a second chamber containing a second fluid,
- a piston mounted movably and having a body in contact with the first fluid and a head coupled to the body, the head being mounted movably inside the second chamber and separating the second chamber into first and second compartments,
- an inlet terminal designed to be connected to a source of the second fluid, and
- a main valve connected to the first compartment and to the inlet terminal, the main valve being configured to direct the second fluid into the first compartment in order to move the piston so as to increase a pressure of the first fluid to bring about movement of the rod in a crimping direction and crimp the part to the support.

The main valve is connected to the second compartment and is furthermore configured to direct the second fluid into the second compartment in order to move the piston so as to reduce the pressure of the first fluid to bring about a movement of the rod in an opposite direction to the crimping direction.

The proposed crimping tool provides a better control of the power supplied to move the rod. In particular, the tool enables a better control of the pressure increase of the first fluid, particularly due to the fact that a single fluid is used to move the piston. The need to compress a first return spring during the crimping operation is thus circumvented, the friction of the piston then being greatly reduced thereby enhancing control of the tractive force generated by the rod. Such a tool enables a greater speed to be obtained in the crimping operation.

The tool can comprise an outlet terminal designed to allow outlet of the second fluid and connected to the main valve, the main valve comprising a member mounted movably between a rest position in which the second compartment is coupled to the inlet terminal and the first compartment is coupled to the outlet terminal and an active position in which the first compartment is coupled to the inlet terminal and the second compartment is coupled to the outlet terminal.

The tool can also comprise a trigger valve connected to the inlet terminal and to the member of the main valve by a feed pipe, and the trigger valve is configured to connect the feed pipe with the inlet terminal so as to move the member of the main valve to its active position.

The main valve can comprise an elastic component connected to the member of the main valve and configured to move the member of the main valve to its rest position when a pressure of the second fluid exerted on the member of the main valve is lower than a pressure exerted by the elastic component on the member of the main valve.

The tool can comprise a detection valve connected to the feed pipe, to the first fluid, and to the member of the main valve by an auxiliary duct, and the detection valve is configured to connect the auxiliary duct with the feed pipe when a pressure of the first fluid is higher than a threshold so as to move the member of the main valve to its rest position.

The rod can be threaded in order to be screwed onto the part, the crimping tool comprising a motor able to be actuated by the second fluid and coupled to the rod, a control valve of the motor connected to the inlet terminal, to the auxiliary duct and to the motor via a control line, and the control valve of the motor is configured to connect the control line with the inlet terminal in order to drive the rod in rotation to unscrew the rod from the part.

The second chamber can be made from a material comprising polyester fibres.

According to another feature of the invention, a method for crimping a part on a support is proposed comprising provision of a crimping tool comprising a movably mounted rod, a first chamber containing a first fluid, a second chamber containing a second fluid, a movably mounted piston having a body in contact with the first fluid and a head coupled to the body, the head being mounted movably inside the second chamber and separating the second chamber into first and second compartments, the method comprising removable fixing of the rod with the part and injection of the second fluid into the first compartment to move the piston so as to increase a pressure of the first fluid to bring about movement of the rod in a crimping direction and crimp the part onto the support. The method further comprises injection of the second fluid into the second compartment in order to move the piston so as to reduce the pressure of the first fluid to bring about movement of the rod in an opposite direction to the crimping direction.

DESCRIPTION OF THE DRAWINGS

Other advantages and features will become more clearly apparent from the following description of particular embodiments and implementation modes of the invention given for non-restrictive example purposes only and represented in the appended drawings, in which.

DETAILED DESCRIPTION

Figure 1:
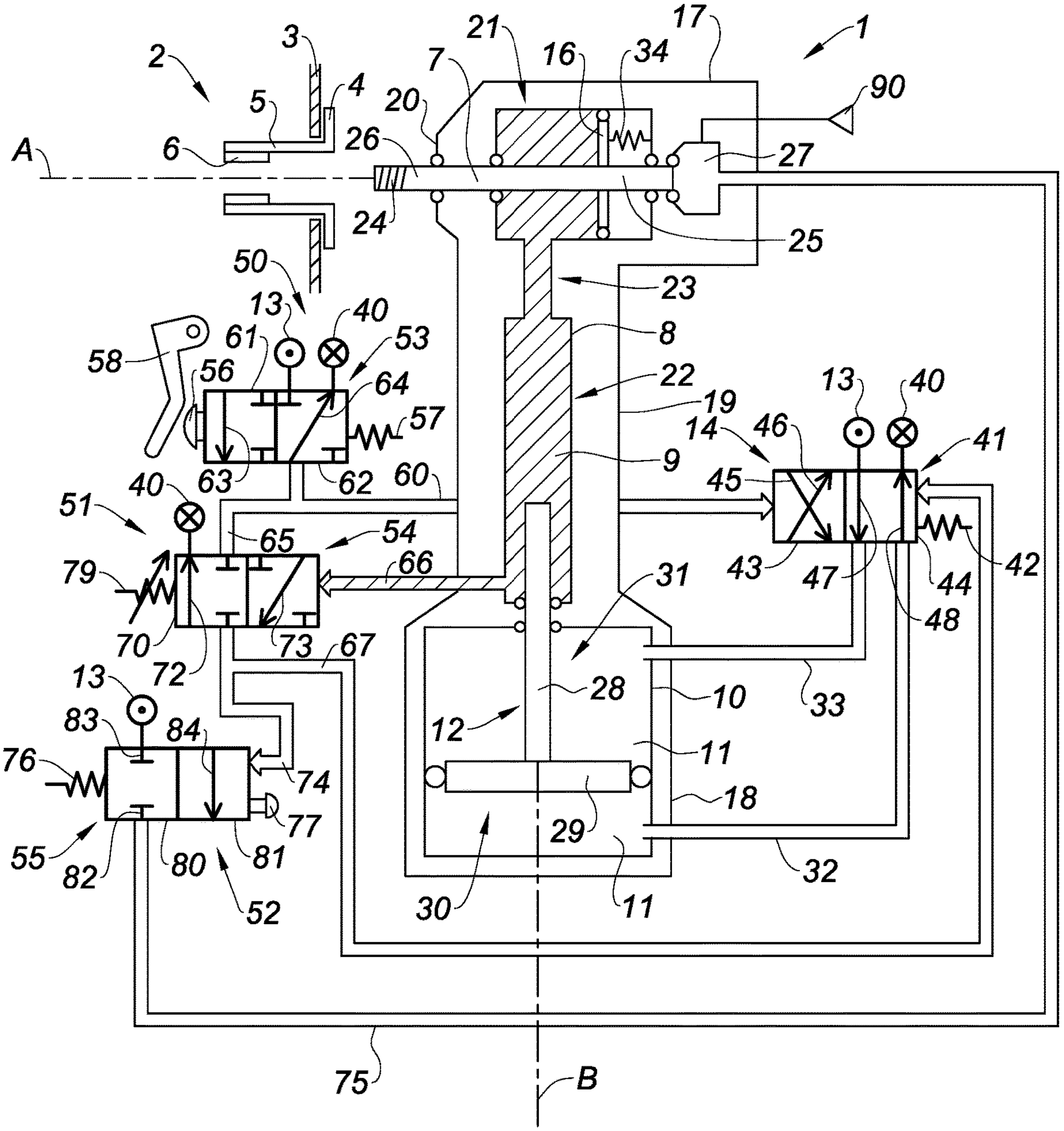
FIG. 1 schematically illustrates an embodiment of a crimping tool according to the invention.

In FIG. 1, an embodiment of a crimping tool 1 for crimping a part 2 on a support 3 has been represented. Crimping tool 1 enables part 2, called crimpable part, to be crimped on any type of support 3. Part 2 can be a rivet provided with a mandrel, or a nut or a stud. Part 2 is a preferably a nut comprising a bearing head 4 and a deformable body 5, deformable body 5 comprising an internal thread 6. Tool 1 comprises a rod 7, a first chamber 8 containing a first fluid 9, a second chamber 10 containing a second fluid 11, a piston 12 also referred to as main piston, an inlet terminal 13 and a main valve 14.

Crimping tool 1 comprises a body 15 inside which rod 7, first chamber 8, second chamber 10 and main piston 12 are housed. Tool 1 further comprises an additional piston 16 noted secondary piston. In particular, body 15 of tool 1 comprises a head 17, a base 18 and an intermediate part 19 joining base 18 to head 17. Intermediate part 19 enables tool 1 to be gripped by a user. Head 17 of body 15 of tool 1 extends longitudinally along a longitudinal axis A, and further comprises a placing nose 20 situated at one end of head 17. First chamber 8 comprises a first housing 21 situated in head 17 of tool 1 and a second housing 22 situated in intermediate part 19. Housings 21, 22 are connected to one another, i.e. they communicate with one another, either directly or via an intermediate housing 23.

Rod 7, also called traction rod, is located partially in first housing 21 of first chamber 8. Rod 7 is configured to collaborate in removable manner with part 2, i.e. rod 7 can be mechanically coupled with and uncoupled from part 2. Collaboration of rod 7 with part 2 enables part 2 to be crimped to support 3. In this way, when rod 7 collaborates mechanically with part 2, the movements made and the forces exerted by rod 7 are transferred to part 2. According to a preferred embodiment, rod 7 comprises a section devoid of external thread 24 designed to be screwed into internal thread 6 of part 2 of nut type. As a variant, rod 7 can comprise a tapping, i.e. an internal thread, to collaborate with an external thread of part 2 of stud type. According to another embodiment, rod 7 comprises jaws designed to collaborate with the mandrel of part 2 of rivet type. In general manner, rod 7 is mounted movable in rotation and in translation with respect to longitudinal axis A. Rod 7 extends along longitudinal axis A and comprises a rear part 25 and a front part 26 on which external thread 22 is formed. Front part 26 is situated opposite rear part 25. Tool 1 further comprises a motor 27 and rear part 25 of rod 7 is mechanically coupled to motor 27. What is meant by front and rear are the two ends of head 17 of body 15 of tool 1 with respect to longitudinal axis A. In other words, the front corresponds to the part of head 17 illustrated on the left of FIG. 1 and the rear corresponds to the part of head 17 illustrated on the right of FIG. 1. Motor 27 and rod 7 are located in head 17 of tool 1. Motor 27 is configured to drive rod 7 in rotation around longitudinal axis A, in particular to screw or unscrew rod 7 with respect to part 2. Rod 7 is further mechanically coupled to secondary piston 16. Secondary piston 16 is housed in first housing 21 of first chamber 8.

Furthermore, main piston 12 is mounted movable inside body 15 of tool 1. Main piston 12 comprises a body 28 in contact with first fluid 9 and a head 29 coupled with body 28. In particular, head 29 is mounted movable inside second chamber and separates second chamber 10 into a first compartment 30 and a second compartment 31. More particularly, main piston 12 is mounted movable in translation along a translation axis B. Translation axis B can be perpendicular or inclined, or there again parallel, with respect to longitudinal axis A. In the embodiment illustrated in FIG. 1, translation axis B is perpendicular to longitudinal axis A. Main piston 12 is designed to be moved in translation to compress first fluid 9 so as to move rod 7 backwards to crimp part 2 on support 3. Main piston 12 is driven in movement by means of second fluid 11 and main valve 14.

Inlet terminal 13 is designed to be connected to a source of second fluid 11. Second fluid 11 is preferably a gas, for example air. The air provided by the source is preferably compressed.

Main valve 14 is connected to first compartment 30 via a main duct 32 and to inlet terminal 13. Main valve 14 is thus configured to direct second fluid 11 into first compartment 30 to move main piston 12 so as to increase the pressure of first fluid 9. The pressure increase of first fluid 9 causes movement of rod 7 in a crimping direction resulting in part 2 being crimped to support 3. First fluid 9 is preferably a liquid, for example oil. The crimping direction is directed towards the rear of head 17 of body 15 of tool 1. More particularly, when main piston 12 translates in a first direction from a starting position of main piston 12, body 28 of piston 12 penetrates farther into first chamber 8 and increases the pressure of first fluid 9. The pressure increase of first fluid 9 causes movement of secondary piston 16 towards the rear of head 17 of tool 1. Movement of secondary piston 16 to the rear results in a translational movement of rod 7 collaborating with part 2 along longitudinal axis A towards the rear of head 17. Translation of the assembly formed by rod 7 and part 2 results in a deformation of deformable body of part 2 to crimp the latter to support 3. Movement of rod 7 towards the rear of head 17 of tool 1 corresponds to movement in the crimping direction. In other words, when rod 7 translates to the rear, i.e. in a direction opposite to placing nose 20, translation of rod 7 pulls part 2 that is mechanically coupled to rod 7 so as to deform deformable body 5. Deformation of body 5 of part 2 forms a crimp bead, enabling a crimping operation to be performed. The crimping operation is the fact of wedging support 3 between bearing head 4 and the formed crimp bead thereby securing part 2 to support 3. To cause deformation of deformable body 5, placing nose 20 is pressing against bearing head 4 and, when translation of rod 7 towards the rear of head 17 of tool 1 takes place, internal thread 6 of deformable body 5 moves towards bearing head 4 and deformable body 5 deforms to form the crimp bead. Rod 7 is then unscrewed by the action of motor 27 to uncouple rod 7 from part 2, and part 2 remains fixed to support 3.

In particular, main valve 14 is connected to second compartment 31 via a secondary duct 33 and is further configured to direct second fluid 11, supplied by inlet terminal 13, into second compartment 31 in order to move main piston 12 so as to reduce the pressure of first fluid 9. Reduction of the pressure of first fluid 9 results in movement of rod 7 in a reverse direction, opposite from the crimping direction. More particularly, when second fluid 11 is directed into second compartment 31, main piston 12 is returned to its initial position. The movements of main piston 12 are thus brought about by the action of second fluid 11 and are controlled by main valve 14. A more precise movement of main piston 12 is then obtained, thereby enabling a better mastery of the tractive force generated by rod 7 on part 2 to be crimped. In particular, main valve 14 controls the movements of main piston 12 in the first direction to compress first fluid 9 or in a second direction opposite from the first direction to reduce the pressure of first fluid 9. According to the embodiment illustrated in FIG. 1, the first direction corresponds to a movement of main piston 12 directed towards head 17 of tool 1 and the second direction corresponds on the contrary to a movement of main piston 12 away from head 17 to return piston 12 to its initial position. In other words, when main piston 12 translates in the second direction, body 28 of the latter tends to withdraw from first chamber 8 to reduce the pressure of first fluid 9. Reduction of the pressure of first fluid 9 allows movement of secondary piston 16 towards the front of head 17 of tool 1 by means of a first return spring 34 having the function of returning secondary piston 16 to an initial position.

Frontward movement of secondary piston 16 results in movement of rod 7 in translation along longitudinal axis A, towards the front of head 17, and returns rod 7 to an initial position. Movement of rod 7 towards the front of head 17 of tool 1 corresponds to a movement in the return direction.

Tool 1 can comprise an outlet terminal 40 designed to allow outlet of second fluid 11. What is meant by outlet of second fluid 11 is a flow of second fluid 11 in the direction of the source of second fluid 11. On the contrary, what is meant by "directing second fluid 11 towards a component" is a flow of second fluid 11 from the source of second fluid 11 towards the component. Outlet terminal 40 is further connected to main valve 14. Main valve 14 further comprises a member 41 mounted movable between a rest position, illustrated in FIG. 1, in which second compartment 31 is coupled to inlet terminal 13 and first compartment 30 is coupled to outlet terminal 40, and an active position, illustrated in FIG. 4, in which first compartment 30 is coupled to inlet terminal 13 and second compartment 31 is coupled to outlet terminal 40.

Main valve 14 advantageously comprises an elastic component 42 connected to member 41, for example a first return spring, configured to generate a return force and to return member 41 to the rest position when a force exerted on member 41 is lower than the return force. More particularly, member 41 of main valve 14 comprises a first part 43 and a second part 44. First part 43 comprises a first circuit 45 to connect inlet terminal 13 with main duct 32 and a second circuit 46 to connect outlet terminal 40 with secondary duct 33 when member 41 of main valve 14 is in its active position. Second part 44 comprises a first circuit 47 to connect inlet terminal 13 with secondary duct 33 and a second circuit 48 to connect outlet terminal 40 with main duct 32, when member 41 of main valve 14 is in its rest position. In other words, when member 41 of main valve 14 is in the rest position, circuits 47, 48 of second part 44 of member 41 coincide with inlet terminal 13 and outlet terminal 40. When member 41 of main valve 14 is in the active position, circuits 45, 46 of first part 43 of member 41 coincide with inlet terminal 13 and outlet terminal 40.

Tool 1 can comprise seals to allow movements of main piston 12 and secondary piston 16 and also of rod 7, illustrated by circles in FIG. 1 and not referenced for the sake of simplification. Second chamber 10 can be made from a polymer material comprising reinforcement fibres such as polyester, carbon, glass or aramid fibres, or a mixture of the latter. For example, second chamber 10 can be made from a material comprising polyester fibres, preferably polyoxymethylene fibres, which makes tool 1 lighter compared with a chamber made from metal.

Advantageously, crimping tool 1 comprises one or more other valves 50 to 52. Preferentially, valves 14 and 50 to 52 are housed inside body 15 of tool 1. In FIG. 1, valves 14 and 50 to 52 have been illustrated outside body 15 of tool 1 for the sake of simplification. For example, crimping tool 1 comprises a trigger valve 50, a detection valve 51 and a control valve 52 of motor 27. In general manner, each valve 14, 50 to 52, comprises a member 41, 53 to 55 mounted movable between a rest position and an active position. Each member 41, 53 to 55 comprises a first part and a second part mechanically coupled with the first part so that the first and second parts of a member 41, 53 to 55 move together.

Trigger valve 50 enables the crimping operation of part 2 to be started. In other words, trigger valve 50 initialises translation of rod 7 in the crimping direction. Trigger valve 50 can further comprise a trigger button 56 to move its member 53 from the rest position to the active position. Trigger valve 50 can comprise a first return spring 57 to return member 53 to the rest position. Tool 1 can comprise a trigger 58 mounted movable to command trigger button 56 by contact. For example, trigger 58 is mounted pivotally on body 15 of tool 1. Trigger valve 50 is connected to inlet terminal 13, to outlet terminal 40, and to movable member 41 of main valve 14 by means of a feed pipe 60. Trigger valve 50 is configured to connect feed pipe 60 with inlet terminal 13 to move member 41 of main valve 14 to its active position.

Figure 3:
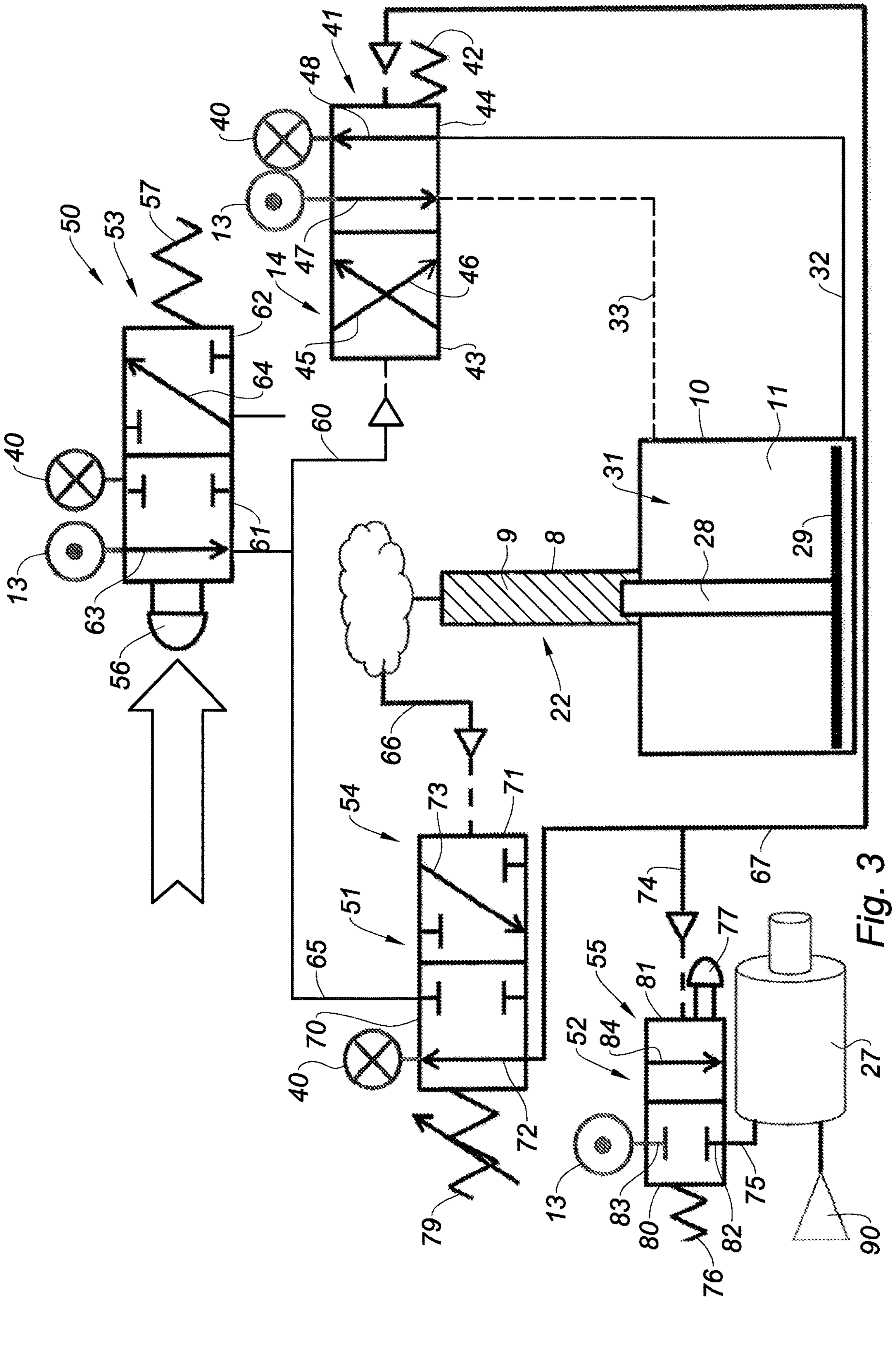
FIG. 3 schematically illustrates the member of the trigger valve in the active position.

More particularly, member 53 of trigger valve 50 comprises a first part 61 and a second part 62. First part 61 comprises a main circuit 63 to connect inlet terminal 13 with pipe 60 when member 53 of trigger valve 50 is in its active position, as illustrated in FIG. 3. Second part 62 comprises a secondary circuit 64 to connect outlet terminal 40 with feed pipe 60 when member 53 of trigger valve 50 is in its rest position, as illustrated in FIG. 1. In other words, when member 53 of trigger valve 50 is in the rest position, secondary circuit 64 of second part 62 of member 53 connects feed pipe 60 with outlet terminal 40, and member 41 of main valve 14 returns to its rest position. When member 53 of trigger valve 50 is in the active position, main circuit 63 of first part 61 of member 53 connects inlet terminal 13 with feed pipe 60, and member 41 of main valve 14 is moved to occupy its active position. Furthermore, elastic component 42 of main valve 14 is configured to move member 41 of main valve 14 to its rest position when a pressure of second fluid 11 located in feed pipe 60, exerted on member 41 of main valve 14, is lower than a pressure exerted by elastic component 42 on member 41 of main valve 14.

Detection valve 51 enables the crimping operation to be stopped when the pressure of first fluid 9 reaches a pressure threshold. The pressure threshold corresponds to a maximum threshold not to be exceeded to avoid deforming support 3 or damaging part 2. The maximum threshold can vary depending on the type of support 3 and the type of part 2. Detection valve 51 is connected to feed pipe 60 via a first connecting pipe 65. Detection valve 51 is further connected to first fluid 9 via a detection duct 66, and to member 41 of main valve 14 via an auxiliary duct 67. Feed pipe 60 is preferably connected to first part 43 of member 41 of main valve 14, and auxiliary duct 67 is connected to second part 44 of member 41. Advantageously, elastic component 42 of main valve 14 is connected to second part 44 of member 41.

Figure 5:
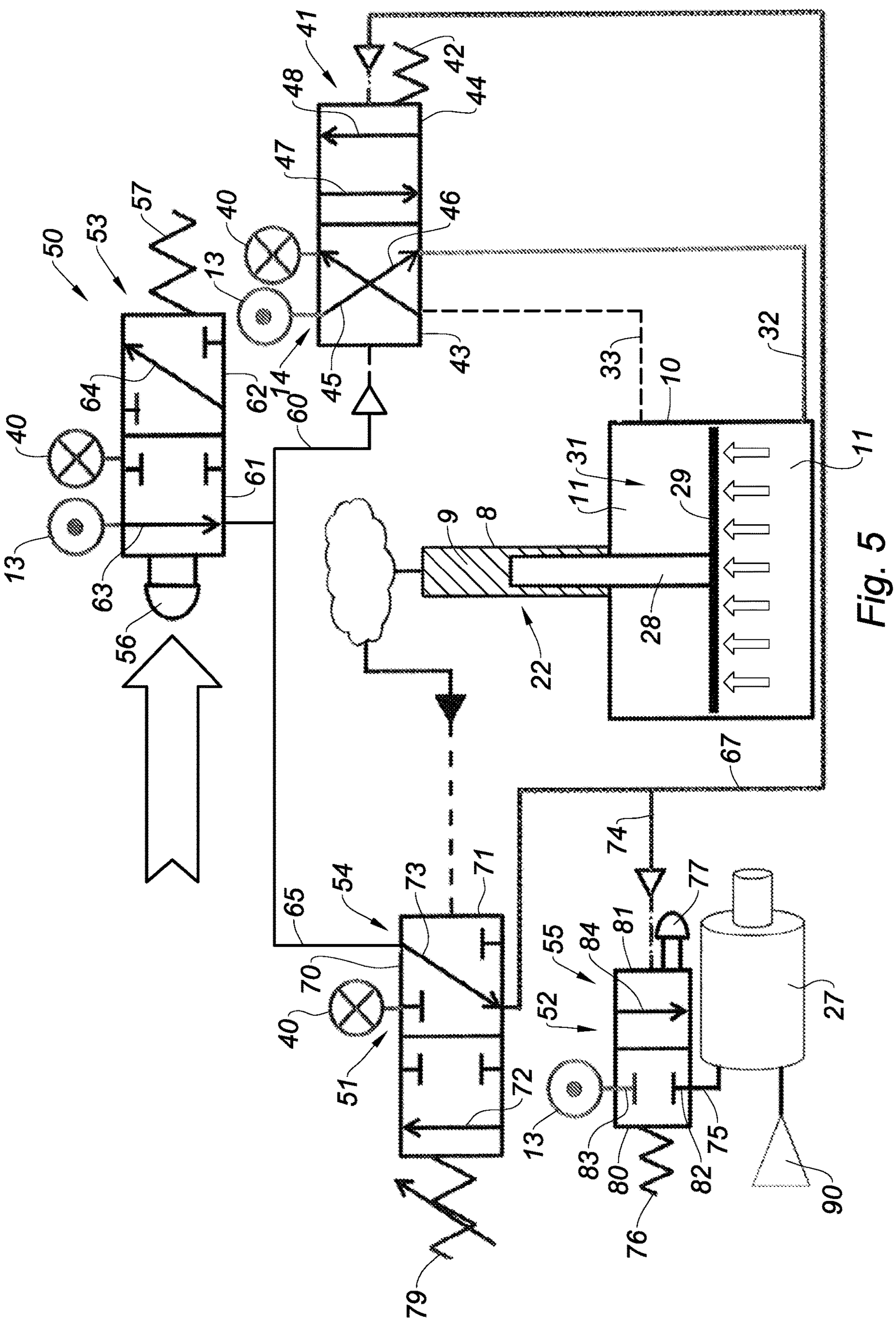
FIG. 5 schematically illustrates the member of the detection valve in the active position.

Detection valve 51 is configured to connect auxiliary duct 67 with feed pipe 60 when a pressure of first fluid 9 is higher than the maximum threshold in order to move member 41 of main valve 14 to its rest position. When member 54 of detection valve 51 occupies its rest position, as illustrated in FIG. 1, detection valve 51 does not in fact act on main valve 14. As soon as the pressure of first fluid 9 exceeds the maximum threshold, the pressure corresponding to the maximum threshold moves movable member 54 of detection valve 51 to its active position, as illustrated in FIG. 5. In this active position, detection valve 51 directs second fluid 11, situated in first connecting pipe 65, to auxiliary duct 67, and the same pressure acts on member 41 of main valve 14 in two opposite directions that compensate one another, i.e. a same pressure of second fluid 11 exists in feed pipe 60 and in auxiliary duct 67. In other words, a same pressure of second fluid 11 is exerted on both first part 43 and second part 44 of member 41 of main valve 14. Elastic component 42 then makes member 41 of main valve 14 return to its rest position, which moves main piston 12 back to its initial position and reduces the pressure of second fluid 9 to terminate the crimping operation.

More particularly, member 54 of detection valve 51 comprises a first part 70 and a second part 71. First part 70 comprises a main circuit 72 to connect outlet terminal 40 with auxiliary duct 67 when member 54 of detection valve 51 is in its rest position. Second part 71 comprises a secondary circuit 73 to connect first connecting pipe 65 with auxiliary duct 67 when member 54 of detection valve 51 is in its active position. In other words, when member 54 of detection valve 51 is in the rest position, main circuit 72 of first part 70 of member 54 connects auxiliary duct 67 with outlet terminal 40 and member 41 of main valve 14 is not commanded by detection valve 51. When member 54 of detection valve 51 is in the active position, secondary circuit 73 of second part 71 of member 54 connects first connecting pipe 65 with auxiliary duct 67 and member 41 of main valve 14 is moved to occupy its rest position.

Detection valve 51 can comprise a return spring 79 to return member 54 to the rest position. Advantageously, return spring 79 generates a variable return force to modify the maximum threshold to be reached so as to be able to adapt tool 1 to different types of components 2. Preferably, return spring 79 is connected to first part 70 of member 54 and detection duct 66 is connected to second part 71 of member 54. In this case, the pressure of first fluid 9 in detection duct 66 must be higher than the return force of return spring 79 to move member 54 of detection valve 51 to its active position.

Control valve 52 of motor 27 enables rotation of rod 7 to be controlled in either direction of rotation. Motor 27 is preferentially a pneumatic motor. Motor 27 is actuated by means of second fluid 11. Control valve 52 is connected to inlet terminal 13, to auxiliary duct 67 via a second connecting pipe 74, and to motor 27 via a control line 75. Control valve 52 can comprise a first return spring 76 to return member 55 to the rest position, as illustrated in FIG. 1. Control valve 52 can further comprise an unscrewing button 77 to command unscrewing of rod 7 manually. Unscrewing button 77 enables member 55 of control valve 52 to move from the rest position to the active position illustrated in FIG. 6. Control valve 52 further enables unscrewing to be controlled in automated manner. Control valve 52 is preferably configured to connect control line 75 with inlet terminal 13 to drive rod 7 in rotation to unscrew rod 7 from part 2. Unscrewing of rod 7 can thus be commanded after the pressure of first fluid 9 has reached the maximum threshold.

More particularly, member 55 of control valve 52 comprises a first part 80 and a second part 81. First part 80 comprises two plugs 82, 83 designed to respectively close control line 75 and interrupt communication between control valve 52 and inlet terminal 13 when member 55 of control valve 52 is in its rest position. Second part 81 comprises a main circuit 84 to connect inlet terminal 13 with control line 75 when member 55 of control valve 52 is in its active position. In other words, when member 55 of control valve 52 is in the active position, main circuit 84 of second part 81 of member 55 connects control line 75 with inlet terminal 13, which determines the direction of second fluid 11 in control line 75, and motor 27 is commanded to drive rod 7 in rotation so as to unscrew rod 7 from part 2. When member 55 of control valve 52 is in the rest position, plugs 82, 83 of first part 81 of member 55 stop the direction of second fluid 11 in control line 75 and motor 27 shuts down.

In FIGS. 2 to 6, operation of crimping tool 1 has been illustrated, in particular the active and rest positions of members 41, 53 to 55 of the different valves 14, 50 to 52.

Figure 2:
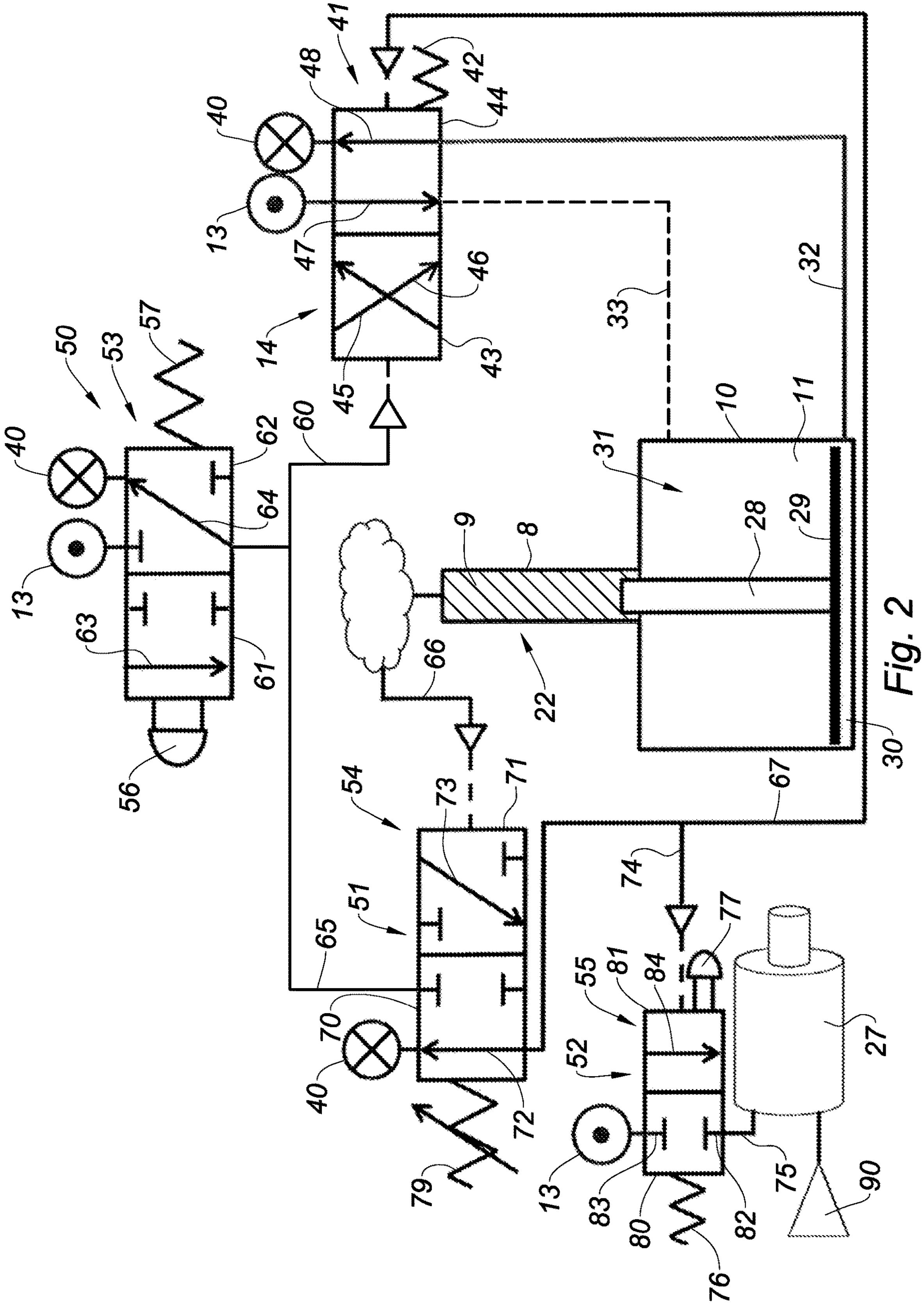
FIG. 2 schematically illustrates the members of the valves of the tool in the rest position.

In FIGS. 1 and 2, members 41, 53 to 55 occupy their rest positions. In this case, main piston 12 occupies its initial position, rod 7 occupies its initial position and motor 27 is shut-down. When main piston 12 occupies its initial position, second fluid 11 is directed by means of main valve 14 into second compartment 31 of second chamber 10. Motor 27 can further be commanded by means of a screwing command 90 to command screwing of rod 7 onto part 2.

Screwing comprises activation of motor 27 in a first direction, called screwing direction, to drive rod 7 in rotation in a screwing direction to screw rod 7 onto part 2.

In FIG. 3, trigger valve 50 is actuated by means of control button 56 and member 53 occupies its active position. In this case, second fluid 11 is directed into feed pipe 60 to command main valve 14, i.e. to move member 41 of main valve 14 to its active position illustrated in FIG. 4.

Figure 4:
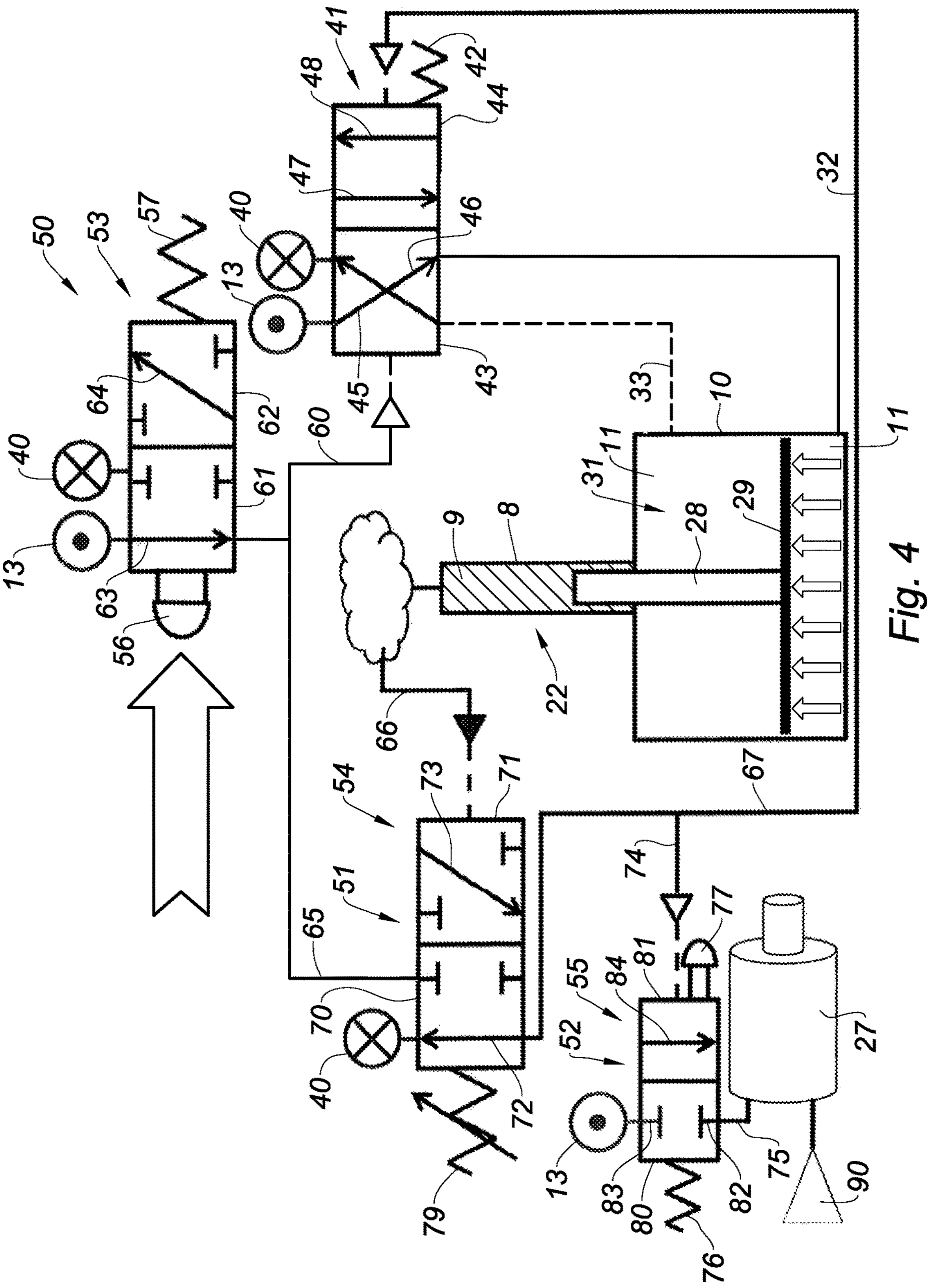
FIG. 4 schematically illustrates the member of the main valve in the active position.

In FIG. 4, member 41 of main valve 14 occupies its active position due to the pressure increase of second fluid 11 in feed pipe 60 that moved member 41. In this case, second fluid 11 is directed into first compartment 30 and main piston 12 moves to increase the pressure of first fluid 9.

Figure 6:
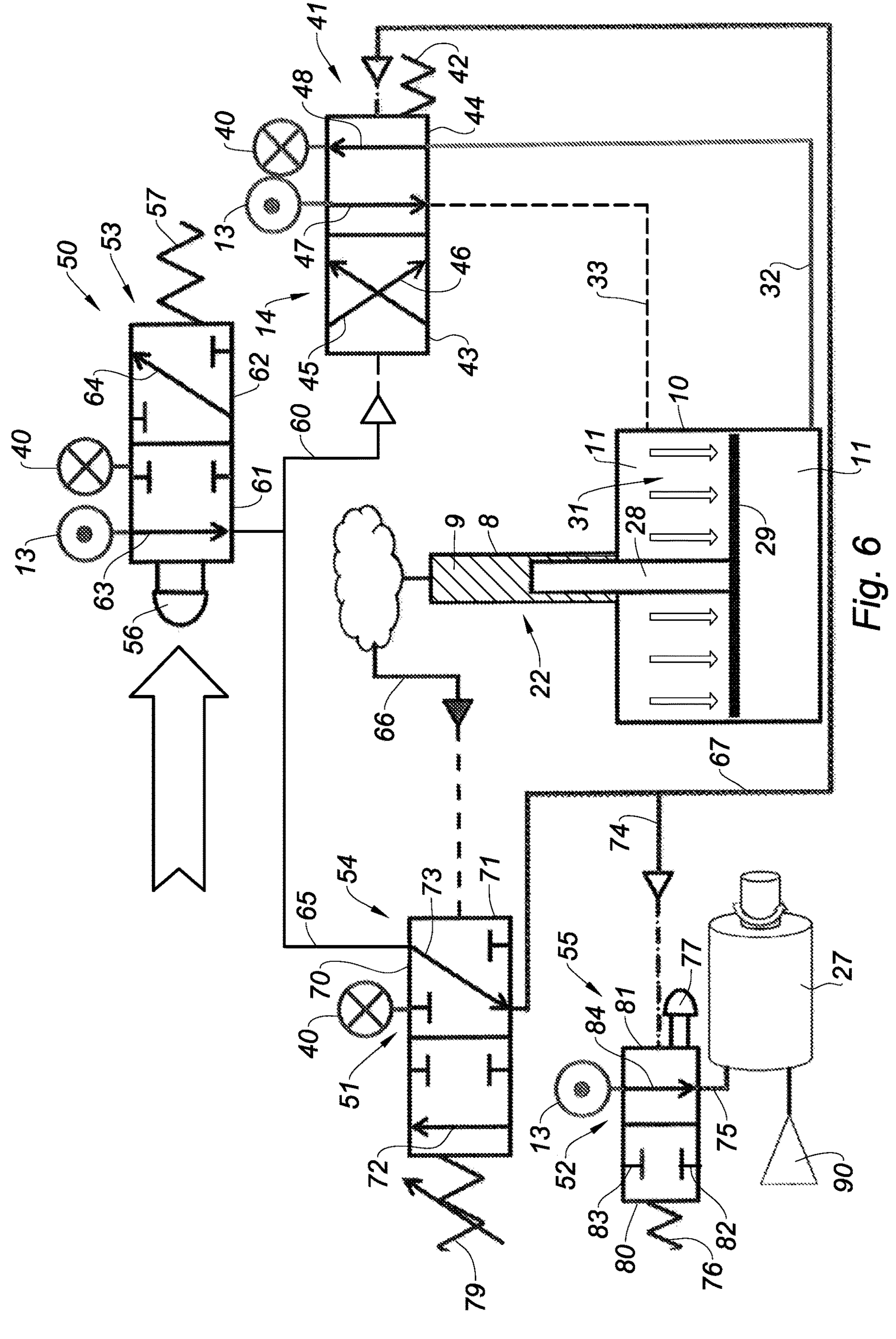
FIG. 6 schematically illustrates the member of the control valve in the active position.

In FIG. 5, member 54 of detection valve 51 occupies its active position due to the fact that the pressure of first fluid 9 has reached the maximum threshold. In this case, second fluid 11 located in first connecting pipe 65 is directed into auxiliary duct 67 to command main valve 14, i.e. to return member 41 of main valve 14 to its rest position, as illustrated in FIG. 6. Furthermore, second fluid 11 located in first connecting pipe 65 is directed into second connecting pipe 74 to command control valve 52, i.e. to move member 55 to its active position, as illustrated in FIG. 6.

In FIG. 6, member 41 of main valve 14 occupies its rest position on account of the pressure increase of second fluid 11 in auxiliary duct 67 and in feed pipe 60, and on account of the return force generated by elastic component 42. In this case, second fluid 11 is directed via main valve 14 into second compartment 31 of second chamber 10 to return main piston 12 to its initial position. Furthermore, second fluid 11 that occupies first compartment 30 of second chamber 10 is directed to outlet terminal 40 by main valve 14 to foment return of main piston 12 to its initial position. Furthermore, member 55 of control valve 52 occupies its active position and second fluid 11 is directed into control line 75 to activate motor 27 to perform the unscrewing operation. In particular, the stiffnesses of spring 42 of main valve 14 and of spring 76 of control valve 52 are chosen such that unscrewing begins after commencement of the return of main piston 12 to its initial position. In other words, the stiffnesses of springs 42 and 76 are chosen so that member 55 occupies its active position after member 41 of main valve 14 occupies its rest position.

The invention claimed is:

1. Crimping tool for crimping a part onto a support comprising:
- a rod mounted movable and configured to collaborate in removable manner with the part;
- a first chamber containing a first fluid;
- a second chamber containing a second fluid;
- a piston mounted movable and having a body in contact with the first fluid and a head coupled to the body, the head being mounted movable inside the second chamber and separating the second chamber into first and second compartments;
- an inlet terminal designed to be connected to a source of the second fluid;
- an outlet terminal designed to allow outlet of the second fluid;
- a main valve connected to the first compartment, the inlet terminal, the outlet terminal and the second compartment, the main valve being configured to direct the second fluid into the first compartment to move the piston so as to increase a pressure of the first fluid to bring about a movement of the rod in a crimping direction and crimp the part to the support, the main valve being configured to direct the second fluid into the second compartment to move the piston so as to reduce the pressure of the first fluid to bring about a movement of the rod in an opposite direction to the crimping direction, the main valve comprising a member mounted movable between a rest position in which the second compartment is coupled to the inlet terminal and the first compartment is coupled to the outlet terminal, and an active position in which the first compartment is coupled to the inlet terminal and the second compartment is coupled to the outlet terminal;
- a trigger valve connected to the inlet terminal and to the member of the main valve by a feed pipe, the trigger valve being configured to connect the feed pipe with the inlet terminal to move the member of the main valve to the active position;
- the main valve comprising an elastic component connected to the member of the main valve and configured to move the member of the main valve to its rest position when a pressure of the second fluid exerted on the member of the main valve is lower than a pressure exerted by the elastic component on the member of the main valve,
- a detection valve connected to the feed pipe, to the first fluid, and to the member of the main valve by an auxiliary duct, and wherein the detection valve is configured to connect the auxiliary duct with the feed pipe when a pressure of the first fluid is higher than a threshold to move the member of the main valve to its rest position.

2. The crimping tool according to claim 1, wherein comprising
- a motor designed to be actuated by the second fluid and coupled to the rod,
- a control valve connected to the inlet terminal, to the auxiliary duct and to the motor by a control line, the control valve being configured to connect the control line with the inlet terminal in order to drive the rod in rotation to unscrew the rod from the part, the rod being threaded to be able to be screwed onto the part.

3. The crimping tool according to claim 1, wherein the second chamber is made from a material comprising polyester fibres.

4. Method for crimping a part onto a support, comprising:
- providing a crimping tool according to claim 1,
- removably fixing the rod of the crimping tool with the part and injecting the second fluid into the first compartment to move the piston so as to increase a pressure of the first fluid to bring about a movement of the rod in a crimping direction and crimp the part to the support,
- injecting the second fluid into the second compartment to move the piston so as to reduce the pressure of the first fluid to bring about a movement of the rod in an opposite direction to the crimping direction.

* * * * *